United States Patent [19]

Winkler

[11] 3,926,313

[45] Dec. 16, 1975

[54] CIRCULAR MAGAZINE FOR PHOTOGRAPHIC TRANSPARENCIES

[75] Inventor: Alfred Winkler, Munich, Germany

[73] Assignee: Agfa-Gevaert AG, Leverkusen, Germany

[22] Filed: Apr. 17, 1974

[21] Appl. No.: 461,737

Related U.S. Application Data

[63] Continuation-in-part of Ser. No. 435,995, Jan. 23, 1974, abandoned.

[30] Foreign Application Priority Data

Apr. 19, 1973 Germany............................ 2320028

[52] U.S. Cl. ................. 206/455; 206/456; 353/117
[51] Int. Cl.².................... B65D 85/48; G03B 23/06
[58] Field of Search ............................... 206/72–73, 206/455, 456; 353/116, 117

[56] References Cited
UNITED STATES PATENTS

| | | | |
|---|---|---|---|
| 2,900,074 | 8/1959 | Windman............................ | 206/456 |
| 3,187,890 | 6/1965 | Brown.................................. | 206/73 |
| 3,225,652 | 12/1965 | Sauppe ........................... | 353/117 X |
| 3,809,469 | 5/1974 | Denis et al....................... | 353/116 X |
| R26,619 | 7/1969 | Hall .................................. | 353/117 |

*Primary Examiner*—William I. Price
*Assistant Examiner*—Steven E. Lipman
*Attorney, Agent, or Firm*—Michael S. Striker

[57] ABSTRACT

A circular tray for slides has two parallel washer-like end walls, radially extending partitions disposed between the end walls, and a cylindrical wall extending inwardly from the inner marginal portion of one end wall to serve as an abutment for slides which are insertable radially inwardly into and removable radially outwardly from compartments between the partitions. The three walls are integral with the partitions, and the length of the radially outermost ends of the compartments equals or slightly exceeds the height of a slide.

11 Claims, 1 Drawing Figure

U.S. Patent  Dec. 16, 1975  3,926,313
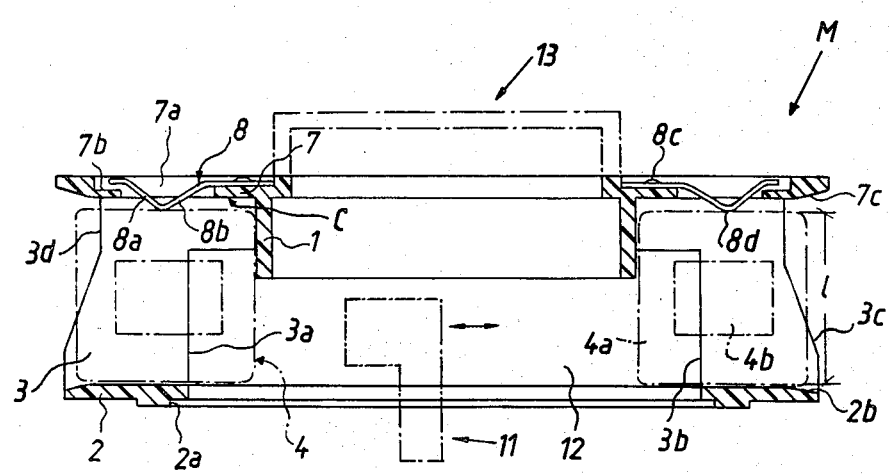

3,926,313

CIRCULAR MAGAZINE FOR PHOTOGRAPHIC TRANSPARENCIES

CROSS-REFERENCE TO RELATED APPLICATION

The present application is a continuation-in-part application of the copending application Ser. No. 435,995, filed Jan. 23, 1974, now abandoned.

BACKGROUND OF THE INVENTION

The present invention relates to improvements in circular magazines or trays for photographic transparencies commonly known as slides.

There are two categories of circular magazines with radially extending compartments for slides which are separated from each other by partitions. The first category includes magazines wherein the compartments are open from below so that a slide which reaches a predetermined position can descend by gravity to enter the gate in front of the projection lens and behind the objective of the slide projector. The slide is thereupon lifted to reenter the respective compartment before the magazine is indexed to move the next (or a selected) slide into register with the gate. Such magazines, and the slide projectors therefor, are rather complex and expensive.

The second category includes magazines wherein the compartments are open at their outer and inner sides. When a slide reaches a selected position with respect to the gate, a slide changer causes it to move radially outwardly along a substantially horizontal path. In many instances, the slide must be lifted prior to removal from the respective compartment so as to be capable of sliding over a relatively low barrier or rail which surrounds the lower radially outermost portions of compartments to allow for some tilting of the magazine without permitting the slides from leaving their compartments, for example, during attachment of a magazine to or during its removal from the slide projector. Such magazines are rather complex and the slide changing mechanism is also complicated and therefore prone to malfunction.

It is also known to provide a circular magazine for radially movable slides with relatively weak springs which yieldably hold the slides in the respective compartments so that the aforementioned barrier or rail can be dispensed with. The springs are just strong enough to retain the slides during tilting of the tray but do not offer an excessive resistance to the slide changing mechanism which is employed to move the slides radially of the magazine between the respective compartments and the gate of the projector. The present invention relates to the just described types of circular slide magazines.

SUMMARY OF THE INVENTION

An object of the invention is to provide a simple, compact, lightweight, inexpensive and versatile circular magazine or tray for photographic transparencies or slides which can be used in combination with a simple and rugged slide changing mechanism, which can be used in or with nearly all known slide projectors wherein the slides are to move radially between the respective compartments and the gate of the slide projector, and which can be turned upside down or from a vertical into a horizontal plane and vice versa without causing appreciable shifting of slides in their compartments.

Another object of the invention is to provide a circular magazine which can be loaded with slides and from which the slides can be removed by hand with a minimum of effort, and wherein the slides are properly oriented and held against uncontrolled shifting and/or complete removal radially inwardly or outwardly as well as in both axial directions of the magazine.

The invention is embodied in a circular magazine or tray for slides having a predetermined height. The magazine comprises spaced apart first and second end walls, and a plurality of substantially radially extending partitions disposed between the end walls and defining therewith slide-receiving compartments. Each compartment has an open outer end whose length equals or slightly exceeds the height of a slide so that the slides are insertable and removable through the outer ends of the respective compartments. The end walls preferably have flat internal surfaces which are parallel to each other. At least one of the end walls may be provided with abutment means for limiting the extent of insertion of slides into the respective compartments.

The novel features which are considered as characteristic of the invention are set forth in particular in the appended claims. The improved magazine itself, however, both as to its construction and its mode of operation, together with additional features and advantages thereof, will be best understood upon perusal of the following detailed description of certain specific embodiments with reference to the accompanying drawing.

BRIEF DESCRIPTION OF THE DRAWING

The single FIGURE is an axial sectional view of a circular magazine which embodies the invention, two photographic transparencies being indicated by phantom lines.

DESCRIPTION OF THE PREFERRED EMBODIMENTS

The improved circular magazine or tray M has three walls 1, 2, 7, a plurality of radially extending compartments C which are separated from each other by L-shaped partitions 3, and a set of leaf springs 8, one for each compartment C. If the magazine M is to be located in a horizontal plane when properly attached to or inserted into a slide projector, the wall 2 or 7 is the bottom end wall and the wall 7 or 2 is the top end wall. The end walls 2 and 7 resemble flat washers which are coaxial with each other and whose mutual spacing determines the height of the compartments C. The third wall 1 is a short cylinder which extends from the inner marginal portion of the end wall 7 toward but short of the inner marginal portion of the end wall 2. The height $l$ of the slides 4 in compartments C equals or is only slightly less than the distance between the outer marginal portions of the walls 2 and 7; each slide 4 comprises a metallic, plastic or cardboard frame 4a for an image-bearing transparency 4b. When a slide 4 is properly inserted into the respective compartment C, the inner edge face of its frame 4a abuts against or is close to the wall 1, the lower edge face of its frame abuts against the end wall 2, and the upper edge face of its frame is engaged and held by the respective spring 8. The axial length of the wall 1 is shown as being equal or nearly equal to half the distance between the end walls 2 and 7.

The underside of the end wall 2 (which is assumed to constitute the bottom end wall of the magazine M) is provided with an annulus of teeth 2a which mate with the pinion of an indexing mechanism (not shown) when the magazine is mounted in or on the housing of the projector so that the magazine can be indexed by increments corresponding to a whole multiple (including one) of the distance between the central planes of two neighboring compartments C. The wall 1 is coaxial with the end walls 2, 7 and all of the walls are preferably integral with each other and also with the partitions 3 so that, with the possible exception of the springs 8, the entire magazine M constitutes a one-piece body which is preferably made of a suitable synthetic plastic material by resorting to injection molding or another well-known technique.

Each of the partitions 3 may constitute a plate of constant thickness; however, it is equally possible to employ wedge-like partitions whose thickness increases radially outwardly to thus insure that the width of each compartment C is constant or nearly constant all the way between the wall 1 and the outer marginal portions of the end walls 2 and 7. Each partition 3 is preferably provided with a square or rectangular cutout 3a in the region between the inner side of the bottom end wall 2 and the inner axial end of the wall 1.

The width of the compartments C in the region of the wall 1 is sufficient to enable an arm or claw 11 of a slide changing mechanism to enter between the two adjacent partitions 3 and to expel the respective slide 4 radially outwardly against the opposition of the respective spring 8. When the slide is returned into its compartment (by a second arm, not shown, of the slide changing mechanism), the arm 11 is located in a chamber 12 which is bounded in part by the wall 1 and extends between the inner marginal portions of the end walls 2 and 7. The arm 11 can move radially outwardly that slide 4 which is in register with the gate of the projector. The radially innermost portions 3b of the partitions 3 can be flanked by pairs of inclined surfaces so that they constitute wedge-like centering means for the arm 11 while the latter moves radially outwardly to enter a selected compartment C and to expel the corresponding slide 4 from such compartment and into the gate. Analogously, the radially outermost portions 3c of the partitions 3 may resemble wedges to center the other arm during return movement of slides 4 into their compartments as well as to enable the frames 4a of such slides to readily find their way during movement back into engagement with the respective springs 8. The inner surfaces of the end walls 2 and 7 are preferably flat and parallel to each other. The extent to which a slide can enter its compartment C is determined by the wall 1.

The top end wall 7 is formed with elongated apertures in the form of slots 7a each of which communicates with one of the compartments C. The outer ends of the slots 7a are bounded by recessed shoulders 7b which constitute stops for the free outer ends of the respective leaf springs 8. The inner ends of the springs 8 are riveted (as at 8c) or otherwise affixed to the end wall 7. The median portion of each spring 8 is of triangular shape and includes two inclined legs 8a, 8b which meet at an apex 8d located in the interior of the respective compartment C and being sufficiently close to the end wall 2 to frictionally engage the upper edge face of the frame 4a in such compartment. When a slide 4 is properly inserted in its compartment C, the free end of the respective spring 8 is spaced apart from the associated stop 7b so that the spring is stressed and urges the frame 4a against the internal surface of the wall 2. It will be noted that the springs 8 need not extend outwardly beyond the end wall 7 so that the maximum height of the magazine M is determined by the distance between the external surfaces of the walls 2 and 7; such maximum height equals or slightly exceeds the height $l$ of a slide 4 plus the combined thickness of the end walls 2 and 7. The thickness of the end wall 2 and/or 7 is negligible when compared with the height $l$. If desired, the springs 8 may be made integral with the wall 7. It is also possible to weld the springs 8 to the wall 7, to secure the springs to the wall 7 by means of a suitable adhesive, or to provide the slots 7a and stops 7b in and to secure the springs 8 to the end wall 2.

The outermost portions 3c of the partitions 3 can be provided with shallow recesses 3d so that the frame 4a of each slide 4 which abuts against the wall 1 can be engaged and withdrawn by two fingers as well as that the slides can be inserted by hand against the opposition of springs 8 and all the way into abutment with the wall 1. When properly inserted, a slide 4 is practically fully protected against damage or unintended shifting during handling of the magazine M; its frame is fully concealed at three edges and the fourth edge is exposed only to the extent which is necessary to render a portion of such edge accessible in the respective recess 3d.

The springs 8 cooperate with the end wall 2 to prevent shifting of slides 4 even if the projector is repeatedly tilted through 90° in order to project the images onto the ceiling or onto a vertical wall or screen.

The outer marginal portions of the walls 2, 7 are preferably chamfered, as at 2b, 7c, along the respective internal surfaces to facilitate the return movement of slides 4 into the respective compartments C under the action of the outer arm of the slide changing mechanism and/or manual insertion of fresh slides.

The improved slide magazine is susceptible of many additional modifications. For example, the substantially L-shaped partitions 3 can be replaced with substantially rectangular partitions. The end wall 7 and/or 2 can constitute a disk (i.e., it need not have a central opening), and one of the end walls 2, 7 (preferably the wall 7) can be provided with a suitable handle (shown by phantom lines, as at 13). The wall 1 may consist of a plurality of discrete axially parallel bars or rods each of which is in register with a portion of the inner end of the respective compartment C so as to constitute an abutment for the adjacent frame 4a.

The arm 11 and the other or outer arm may constitute two prongs of a simple fork-shaped slide changing mechanism. The end wall 2 or 7 replaces the separable cover of a conventional circular magazine wherein the slides are movable radially.

Without further analysis, the foregoing will so fully reveal the gist of the present invention that others can, by applying current knowledge, readily adapt it for various applications without omitting features which fairly constitute essential characteristics of the generic and specific aspects of my contribution to the art and, therefore, such adaptations should and are intended to be comprehended within the meaning and range of equivalence of the claims.

What is claimed as new and desired to be protected by Letters Patent is set forth in the appended claims:

1. A circular magazine for slides having a predetermined height, comprising an annular top wall; and annular bottom wall coaxial with and axially spaced from said top wall; a plurality of substantially radially extending partitions extending between and being integral with said walls and defining therewith slide-receiving compartments, each of said compartments having an outer open end whose height between said walls equals or slightly exceeds said predetermined height so that the slides are insertable and removable through said outer open ends of the respective compartments, each of said partitions having the shape of an inverted L having one leg extending along said top wall and another leg substantially normal thereto and having an outer edge portion aligned with the outer edge of said bottom wall; and abutment means for limiting the extent of radially inward insertion of slides into the respective compartment.

2. A magazine as defined in claim 1, wherein said annular walls have flat internal surfaces which are parallel to each other.

3. A magazine as defined in claim 1, wherein one of said annular walls comprises means for biasing the slides in said compartments against the other of said end walls.

4. A magazine as defined in claim 3, wherein said biasing means comprises a discrete spring for each of said compartments.

5. A magazine as defined in claim 4, wherein said one annular wall has a plurality of apertures, one for each of said springs and each communicating with the respective compartment, said springs having portions extending through said apertures and into the respective compartments.

6. A magazine as defined in claim 5, wherein each of said springs is a leaf spring and said portions of said springs are of triangular shape and have apices in engagement with the frames of slides in the respective compartments.

7. A magazine as defined in claim 4, wherein each of said springs is a leaf spring having a first end secured to said one annular wall and a second end, said one annular wall further having stops against which the second ends of said springs abut, at least when the respective compartments are unoccupied.

8. A magazine as defined in claim 1, wherein each of said partitions has a radially outermost portion provided with a recess, the slides in said compartments having portions extending radially outwardly beyond the recesses of the neighboring partitions.

9. A magazine as defined in claim 1, wherein said annular bottom wall has an inner diameter smaller than that of said top wall, and wherein said other leg of each of said partitions has an inner edge substantially aligned with the inner edge of said bottom wall.

10. A magazine as defined in claim 1, wherein said abutment means is constituted by a cylindrical wall coaxial with said annular wall and projecting from said top wall toward, but short of, said bottom wall.

11. A magazine as defined in claim 10, wherein said cylindrical wall has a height substantially equal to half the distance between said annular walls.

* * * * *